(12) United States Patent
Miller et al.

(10) Patent No.: US 7,896,589 B2
(45) Date of Patent: Mar. 1, 2011

(54) CUTTER FOR ENGAGEMENT WITH AN ARBOR

(75) Inventors: Jeffery R. Miller, Gaines, MI (US); Gary D. Taphouse, Owosso, MI (US)

(73) Assignee: Hougen Manufacturing, Inc., Swartz Creek, MI (US)

( * ) Notice: Subject to any disclaimer, the term of this patent is extended or adjusted under 35 U.S.C. 154(b) by 796 days.

(21) Appl. No.: 11/924,551

(22) Filed: Oct. 25, 2007

(65) Prior Publication Data

US 2009/0110497 A1   Apr. 30, 2009

(51) Int. Cl.
*B23B 51/04* (2006.01)
(52) U.S. Cl. .......... 408/226; 408/204; 408/240; 279/81; 279/83
(58) Field of Classification Search .............. 279/83, 279/93, 81, 75, 137, 19.3–19.6, 71; 408/204, 408/226, 238, 239 R, 240; *B23B 31/107, B23B 51/04, 51/05*
See application file for complete search history.

(56) References Cited

U.S. PATENT DOCUMENTS

| | | | |
|---|---|---|---|
| 2,039,855 A * | 5/1936 | Stone | 279/79 |
| 2,079,460 A | 5/1937 | Marty | |
| 2,731,273 A | 1/1956 | Edens | |
| 2,823,040 A | 2/1958 | Fischer | |
| 2,906,541 A | 9/1959 | DuBois | |
| 2,960,343 A | 11/1960 | Elledge | |
| 2,974,965 A | 3/1961 | Welles, Jr. | |
| 3,405,950 A | 10/1968 | Cox | |
| 3,747,946 A | 7/1973 | Edens | |
| 4,107,949 A | 8/1978 | Wanner et al. | |
| 4,188,041 A | 2/1980 | Soderberg | |
| RE31,755 E | 12/1984 | Wanner et al. | |
| 4,775,269 A | 10/1988 | Brix | |
| 4,818,157 A | 4/1989 | Kouvelis | |
| 5,167,475 A | 12/1992 | Miyanaga | |
| 5,281,060 A | 1/1994 | Strange et al. | |
| 5,427,482 A | 6/1995 | Asano et al. | |
| D360,641 S | 7/1995 | Asano | |

(Continued)

FOREIGN PATENT DOCUMENTS

DE   4222809 A1   1/1993

(Continued)

OTHER PUBLICATIONS

English language abstract for DE4222809 extracted from espacenet.com database, dated Nov. 7, 2008.

(Continued)

*Primary Examiner* — Daniel W Howell
(74) *Attorney, Agent, or Firm* — Howard & Howard Attorneys PLLC

(57) ABSTRACT

A cutter is for driven engagement with a driving device of an arbor. The cutter includes a shank portion having a central axis and extends along the central axis between a first end and a second end. A cutting portion extends from the first end of the shank portion. The shank portion defines an entry channel extending from the second end for guiding the driving device of the arbor during insertion of the shank portion into the arbor. The shank portion also defines a retaining channel extending from the entry channel for selectively retaining the driving device of the arbor. Each of the entry and retaining channels have a trough portion extending toward the central axis. The trough portions of each of the entry and retaining channels have a common configuration for slideably receiving the driving device.

26 Claims, 8 Drawing Sheets

U.S. PATENT DOCUMENTS

| | | |
|---|---|---|
| 5,429,457 A | 7/1995 | Asano et al. |
| D361,579 S | 8/1995 | Asano |
| D361,776 S | 8/1995 | Asano |
| 5,904,456 A | 5/1999 | Chern |
| 6,280,123 B1 | 8/2001 | Gill |
| D560,699 S | 1/2008 | Omi |
| 2005/0105981 A1 | 5/2005 | Byrley et al. |
| 2006/0159531 A1 | 7/2006 | Bortz et al. |

FOREIGN PATENT DOCUMENTS

| | | | |
|---|---|---|---|
| DE | 10100024 A1 | | 7/2002 |
| EP | 0722798 A1 | | 7/1996 |
| EP | 1674182 A1 | | 6/2006 |
| JP | 06315806 A | * | 11/1994 |
| JP | 09011007 A | | 1/1997 |
| JP | 10100009 A | * | 4/1998 |
| JP | 2000033509 A | * | 2/2000 |
| JP | 2001198716 A | * | 7/2001 |
| JP | 2002120218 A | | 4/2002 |
| WO | WO 02064295 A2 | | 8/2002 |
| WO | WO 2004087357 A1 | | 10/2004 |
| WO | WO 2007118626 A1 | | 10/2007 |

OTHER PUBLICATIONS

English language abstract for EP1674182 extracted from espacenet.com database, dated Nov. 7, 2008.

English language translation and abstract for JP09-011007 extracted from PAJ database, dated Nov. 7, 2008, 31 pages.

English language translation and abstract for JP2002-120218 extracted from PAJ database, dated Nov. 7, 2008, 26 pages.

English language abstract for WO 20071118626, 54 pages.

PCT International Search Report for PCT/US20081008045, dated Oct. 24, 2008, 5 pages.

PCT International Search Report for PCT/US20081008046, dated Oct. 24, 2008, 4 pages.

Design U.S. Appl. No. 29/296,707, Miller et al., "Annular Cutter", filed Oct. 25, 2007, 4 pp.

U.S. Appl. No. 11/924,559, Miller et al., "Cutter With Engagement for an Arbor", filed Oct. 25, 2007, 29 pp.

English language abstract for DE 10100024 extracted from espacenet.com database, dated Dec. 17, 2010, 5 pages.

* cited by examiner

CUTTER FOR ENGAGEMENT WITH AN ARBOR

BACKGROUND OF THE INVENTION

1. Field of the Invention

The invention relates to a cutter, e.g., an annular cutter, for engagement with an arbor of a drill machine.

2. Description of the Related Art

Cutters, e.g., annular cutters, are known in the art for engagement with a drill machine for cutting holes in a workpiece. The drill machine includes a housing and a motor coupled to the housing. The arbor is coupled to the motor for rotation with the motor. The arbor defines a bore and the cutter is engaged to the arbor in the bore. A driving device is coupled to the arbor and extends into the bore for engaging the cutter, i.e., to lock the cutter in the bore. The driving device transmits rotation from the arbor to the cutter.

The driving device can be further defined as a set screw that threadedly extends through the arbor and into the bore. The set screw is rotated to threadedly advance and retreat the set screw into and out of the bore to engage and disengage the drill machine, respectively.

Alternatively, the driving device can be further defined as an extending member, e.g., a ball, extending into the bore of the arbor. In such a configuration, the cutter must define a retaining recess such that the extending member engages the cutter in the retaining recess. It is known in the art to provide a locking mechanism for moving the extending member radially within the bore. The locking mechanism moves the extending member is radially outwardly to allow the cutter to be inserted into the bore and removed from the bore. The locking mechanism moves the extending member radially inwardly to engage the extending member with the retaining recess to lock the cutter in the bore.

Both when the driving device is defined as a set screw or as an extending member, the engagement and disengagement of the cutter with the arbor is needlessly complicated and time consuming. With respect to the set screw, the threaded advancement and retreat of the set screw is time consuming. In addition, a hand tool such as an allen wrench, i.e., hex wrench, is required to threadedly advance and retreat the set screw into and out of the bore. With respect to the locking mechanism, the locking mechanism often requires two hands to operate, i.e., one hand to hold the cutter and another hand to operate the locking mechanism. In addition, the locking mechanism is costly and complicated to design and manufacture.

As such there remains the need for an cutter that is quickly and easily engaged and disengaged with the arbor. There also remains the need for a cutter that can be engaged and disengaged with the arbor without the need for a tool or a locking mechanism to lock the cutter to the arbor.

SUMMARY OF THE INVENTION AND ADVANTAGES

The present invention is a cutter for driven engagement with a driving device of an arbor. The cutter comprises a shank portion having a central axis and extending along the central axis between a first end and a second end. The shank portion defines an entry channel extending from the second end for guiding the driving device of the arbor during insertion of the shank portion into the arbor and a retaining channel extending from the entry channel for selectively retaining the driving device of the arbor. A cutting portion extends from the first end of the shank portion. Each of the entry and retaining channels have a trough portion extending toward the central axis with the trough portions of each of the entry and retaining channels having a common configuration for slideably receiving the driving device.

The cutter is easily and quickly engaged and disengaged with the arbor by a push and twist motion. The second end of the cutter is inserted in the arbor and the entry channel is aligned with the driving device. The cutter is moved into the arbor with the driving device sliding along the entry channel. When the driving device reaches the retaining channel, the cutter is twisted, i.e., rotated, to slide the driving device into the retaining channel.

Additionally, the cutter is engaged and disengaged with the arbor without the need for a hand tool or a locking mechanism. Notably, the cutter can be used with an arbor having a locking mechanism and is interchangeable among several arbors each having different types of locking mechanisms.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
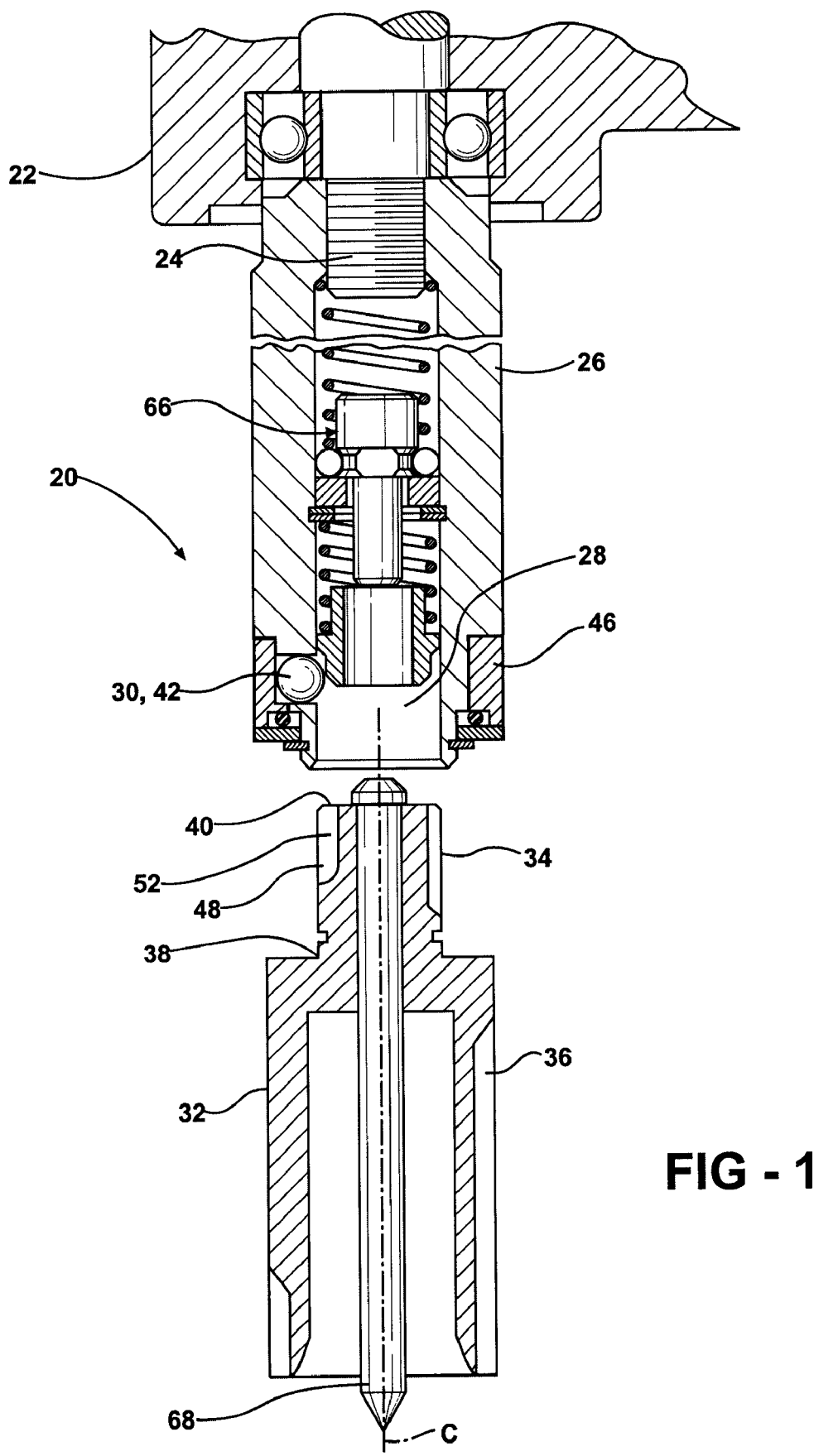
FIG. 1 is a cross-sectional view of a drill machine including a cutter disengaged from the drill machine and an extending member for engaging the cutter.
Figure 2:
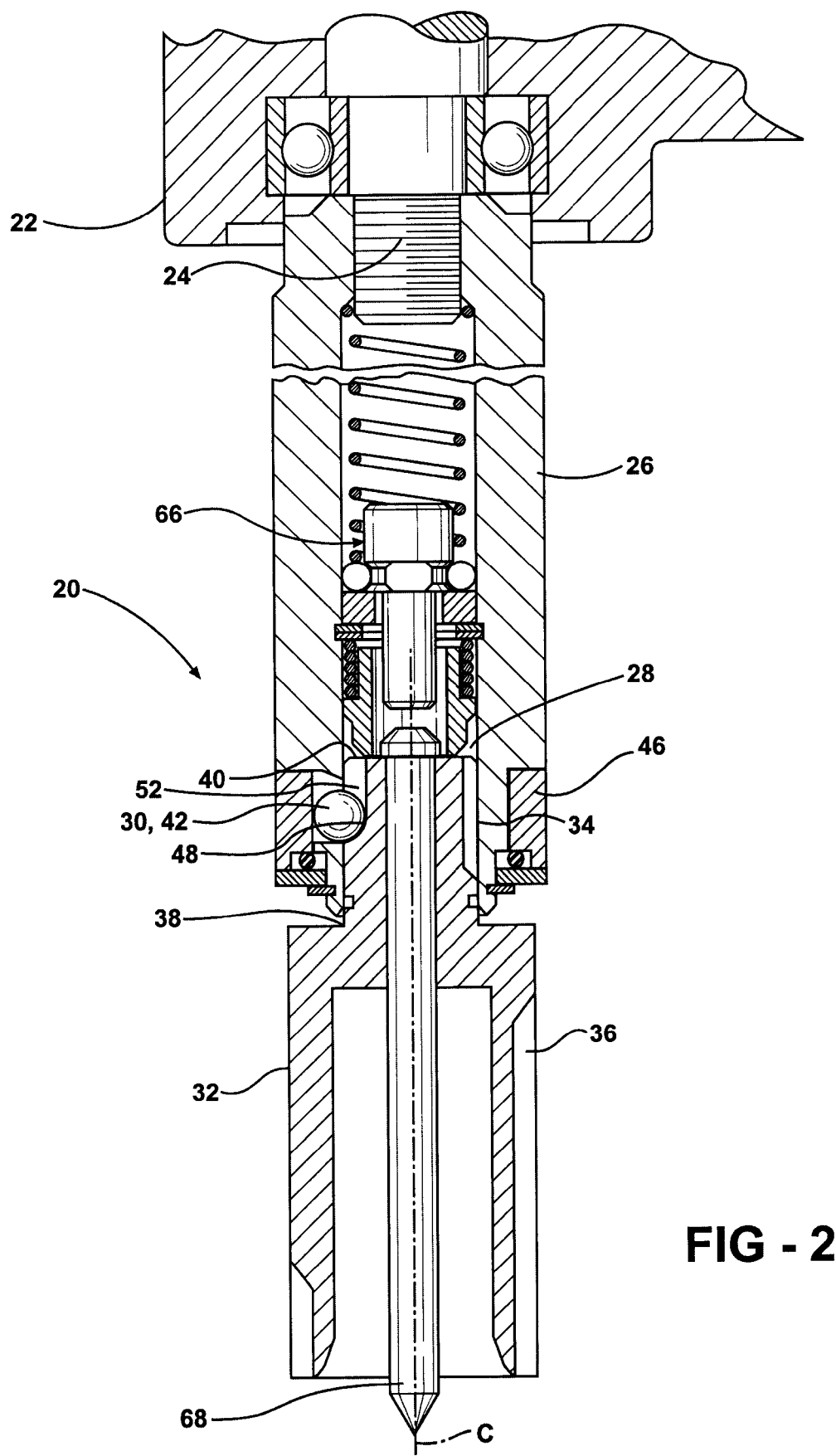
FIG. 2 is a cross-sectional view of the drill machine engaged with the extending member.
Figure 3:
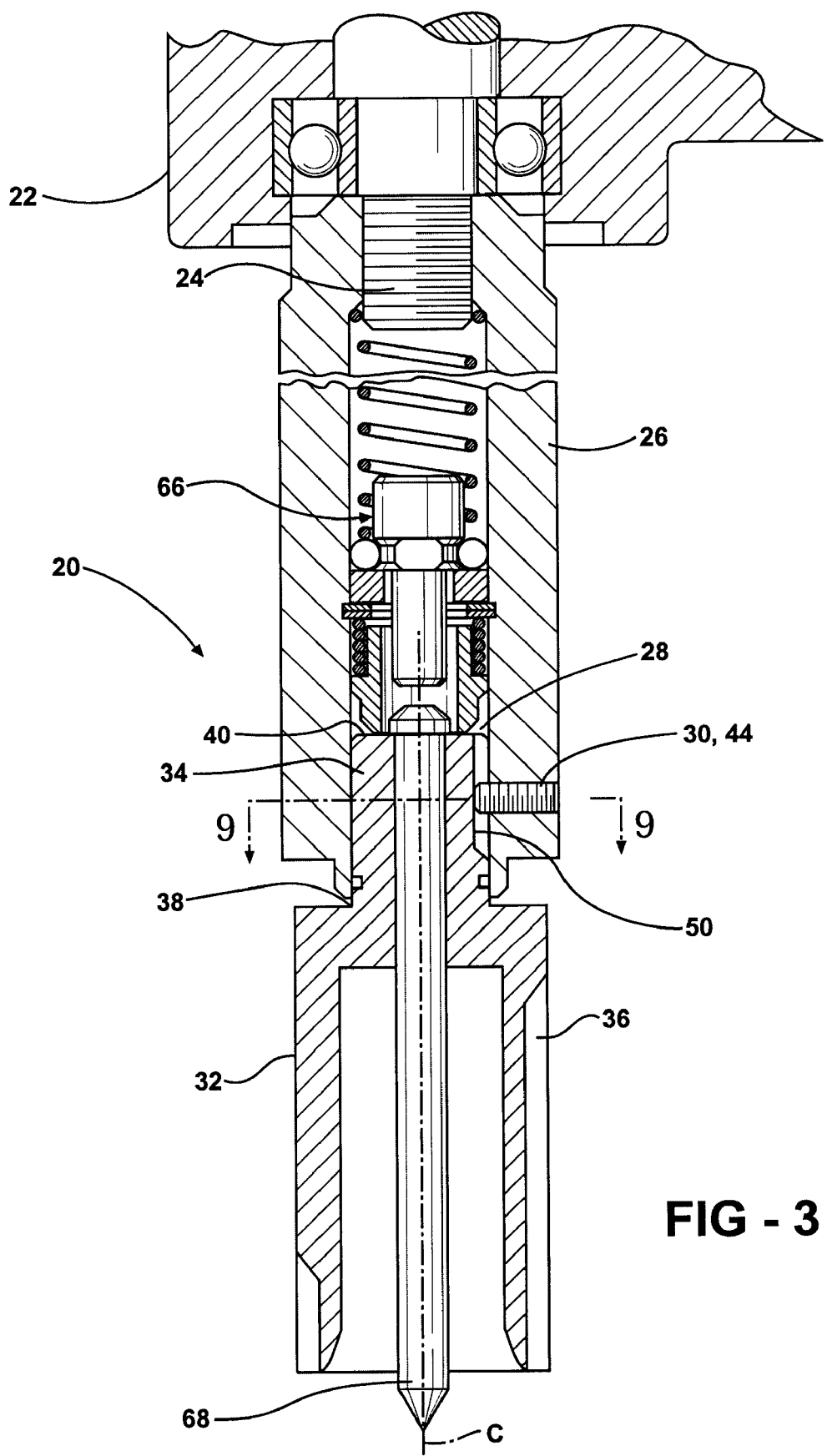
FIG. 3 is a cross-sectional view of another embodiment of the drill machine including a pair of set screws for engaging the cutter.

Referring to the Figures, wherein like numerals indicate like parts throughout the several views, a drill machine is generally shown at 20. As shown in FIGS. 1-3, the drill machine 20 includes a housing 22 and a motor 24 coupled to the housing 22. As appreciated by one skilled in the art, the housing 22 and the motor 24 are generically depicted in the Figures and the housing 22 and motor 24 can be of any type. An arbor 26 is coupled to the motor 24 for rotation with the motor 24. The arbor 26 defines a bore 28 and a driving device 30 is coupled to the arbor 26 and extends into the bore 28. As will be discussed below and as best shown in FIGS. 2 and 3, a cutter 32 is partially inserted into the bore 28 and is coupled to the arbor 26 with the driving device 30. The cutter 32 partially extends from the bore 28 for cutting a workpiece (not shown), which is typically formed from a rigid material such as metal. The cutter 32 rotates relative to the housing 22 to cut a hole in the workpiece. For example, the cutter 32 is sized to cut holes sized between 7/16-2 3/8 inches in diameter and 1-3 inches deep. It should be appreciated that the size of the holes can be any size without departing from the nature of the present invention.

The cutter 32 is more specifically referred to in industry as an annular cutter 32. The cutter 32 includes a shank portion 34 and a cutting portion 36. The cutter 32 extends along a central axis C and each of the shank portion 34 and the cutting portion 36 extend along the central axis C. The shank portion 34 extends along the central axis C between a first end 38 and a second end 40. The cutting portion 36 extends from the first end 38 of the shank portion 34. As best shown in FIGS. 2 and 3, the second end 40 of the shank portion 34 is inserted into the bore 28 of the arbor 26 and is coupled to the arbor 26 with the driving device 30 and the cutting portion 36 extends from the arbor 26.

The cutter 32 is typically formed from metal such as, for example, high speed steel. More specifically, for example, the high speed steel may be M2 steel or M42 steel. However, it should be appreciated that the cutter 32 can be formed from any rigid material known to one skilled in the art without departing from the nature of the present invention. The cutter 32 can include inserts, e.g., carbide inserts (not shown), along a tip of the cutting portion 36 to extend the life of the cutter 32.

Figure 8:
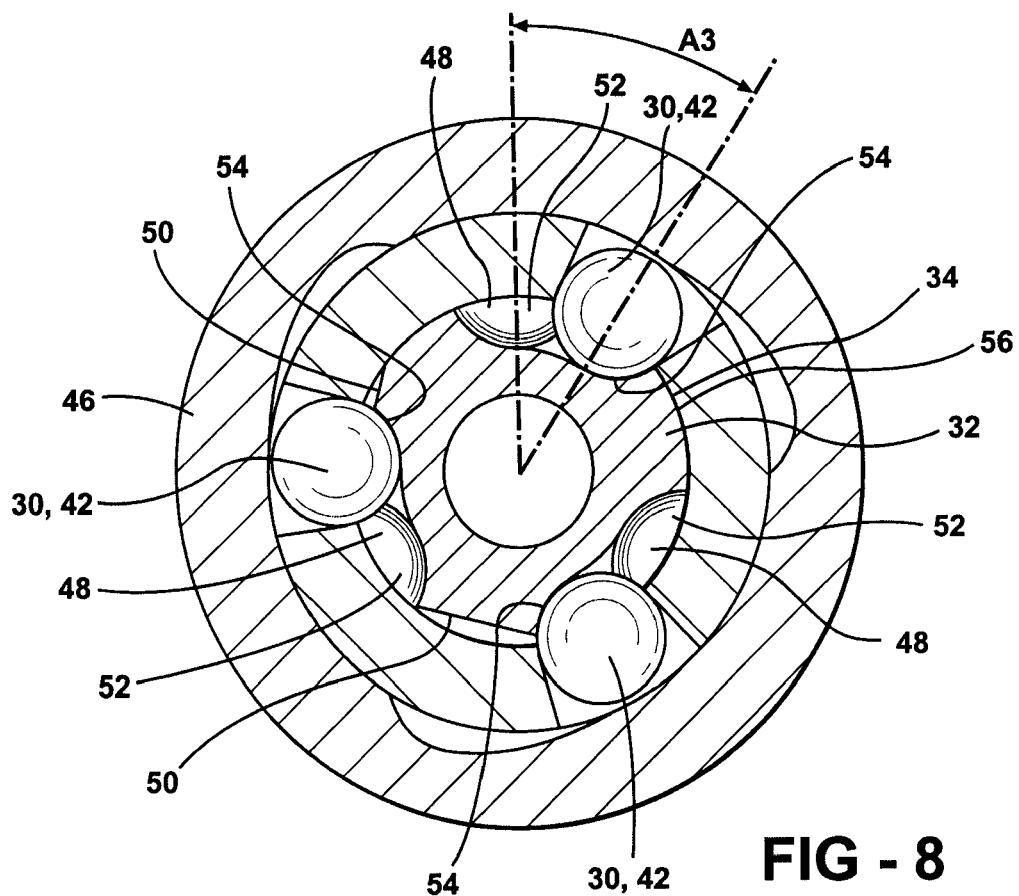
FIG. 8 is a cross-sectional view of the cutter through line 8 of FIG. 2.
Figure 9:
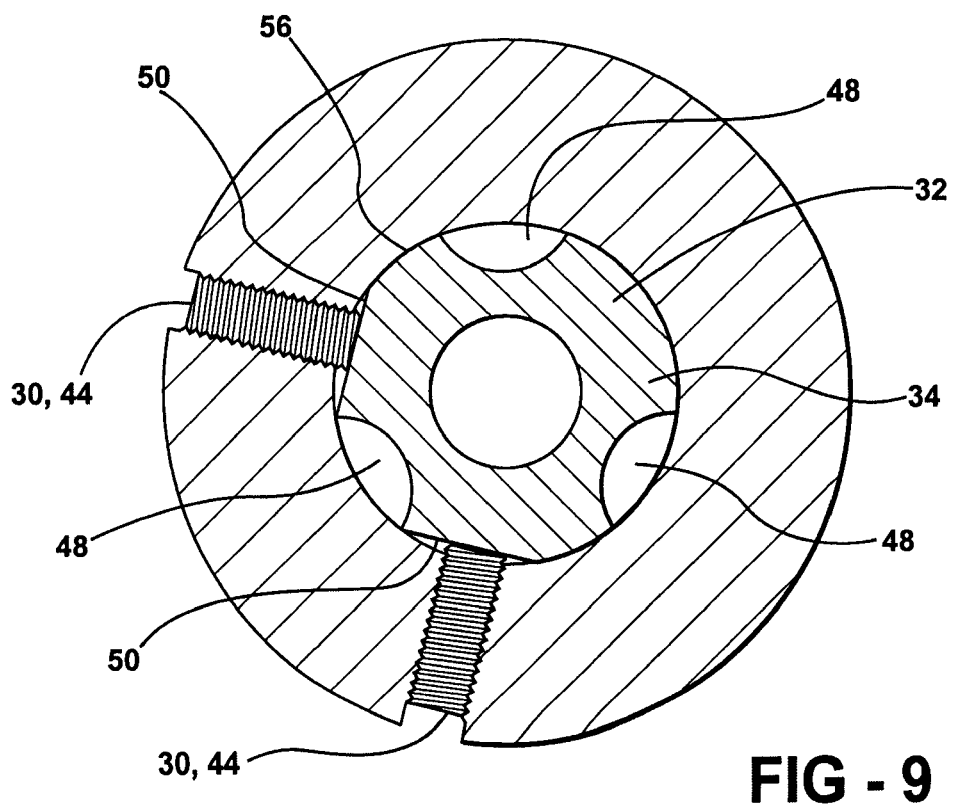
FIG. 9 is a cross-sectional view of the cutter through line 9 of FIG. 3.

The driving device 30 engages the cutter 32 to translate rotational motion from the arbor 26 to the cutter 32. The driving device 30 is further defined as one of an extending member 42 engaged with the arbor 26 in the bore 28, as best shown in FIGS. 2 and 8, and a pair of set screws 44, as best shown in FIGS. 3 and 9. As will be discussed below, in the configuration shown in FIGS. 2 and 8, the extending member 42 engages the cutter 32 and, in the configuration shown in FIGS. 3 and 9, the pair of set screws 44 engage the cutter 32. The extending member 42 shown in FIGS. 1 and 2 is further defined as a ball. However, it should be appreciated that the extending member 42 can be of any type that is engaged with the arbor 26 in the bore 28, such as, for example, a dowel pin. The extending member 42 is selectively moveable radially in the bore 28, i.e., toward and away from the shank portion 34. For example, in the configuration as best shown in FIGS. 1, 2, and 8, the arbor 26 includes a collar 46 that engages the extending member 42. The collar 46 is rotated to move the extending members 42 radially in the bore 28. Alternatively, the extending member 42 is fixed in position in the bore 28.

The shank portion 34 defines a retaining recess 48 and a pair of flats 50. The driving device 30 engages one of the retaining recess 48 and the pair of flats 50. In other words, the driving device 30 engages either the retaining recess 48 or at least one of the pair of flats 50. Specifically, when the driving device 30 is the extending member 42, as shown in FIGS. 2 and 8, the extending member 42 engages the retaining recess 48. When the driving device 30 is the pair of set screws 44, as shown in FIGS. 3 and 9, the pair of set screws 44 engages the pair of flats 50. In other words, the cutter 32 is interchangeable between arbors 26 that have driving members further defined as extending members 42, e.g., balls, and arbors 26 that have driving members further defined as set screws 44.

The retaining recess 48 can be further defined as a plurality of retaining recesses 48 spaced from each other circumferentially about the shank portion 34. In such a configuration, the driving device 30 is further defined as a plurality of extending members 42 spaced circumferentially in the bore 28 of the arbor 26 with each extending member 42 slideable along one of the retaining recesses 48, respectively. In the embodiment shown in Figures, the cutter 32 has three retaining recesses 48 and the arbor 26 shown in FIGS. 2 and 8 has three extending members 42 spaced about the bore 28 to engage each retaining recess 48. It should be appreciated that the cutter 32 can have any number of retaining recesses 48 and the arbor 26 can have a corresponding number of extending members 42 without departing from the nature of the present invention.

Figure 5:
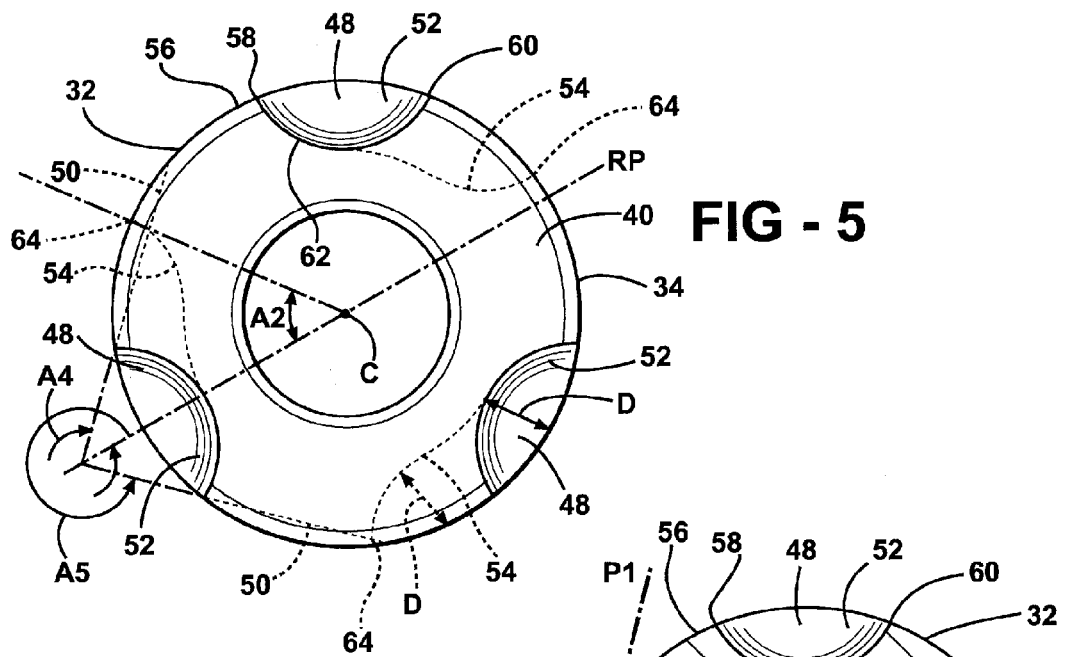
FIG. 5 is a top view of a shank portion of the cutter.

In an embodiment where the shank portion 34 has a plurality of retaining recesses 48, the retaining recesses 48 are typically evenly spaced circumferentially about the shank portion 34. For example, as best shown in FIG. 5, the three retaining recesses 48 are circumferentially spaced 120 degrees apart from each other. However, it should be appreciated that the plurality of retaining recesses 48 can be spaced at any interval circumferentially about the shank portion 34.

Figure 4:
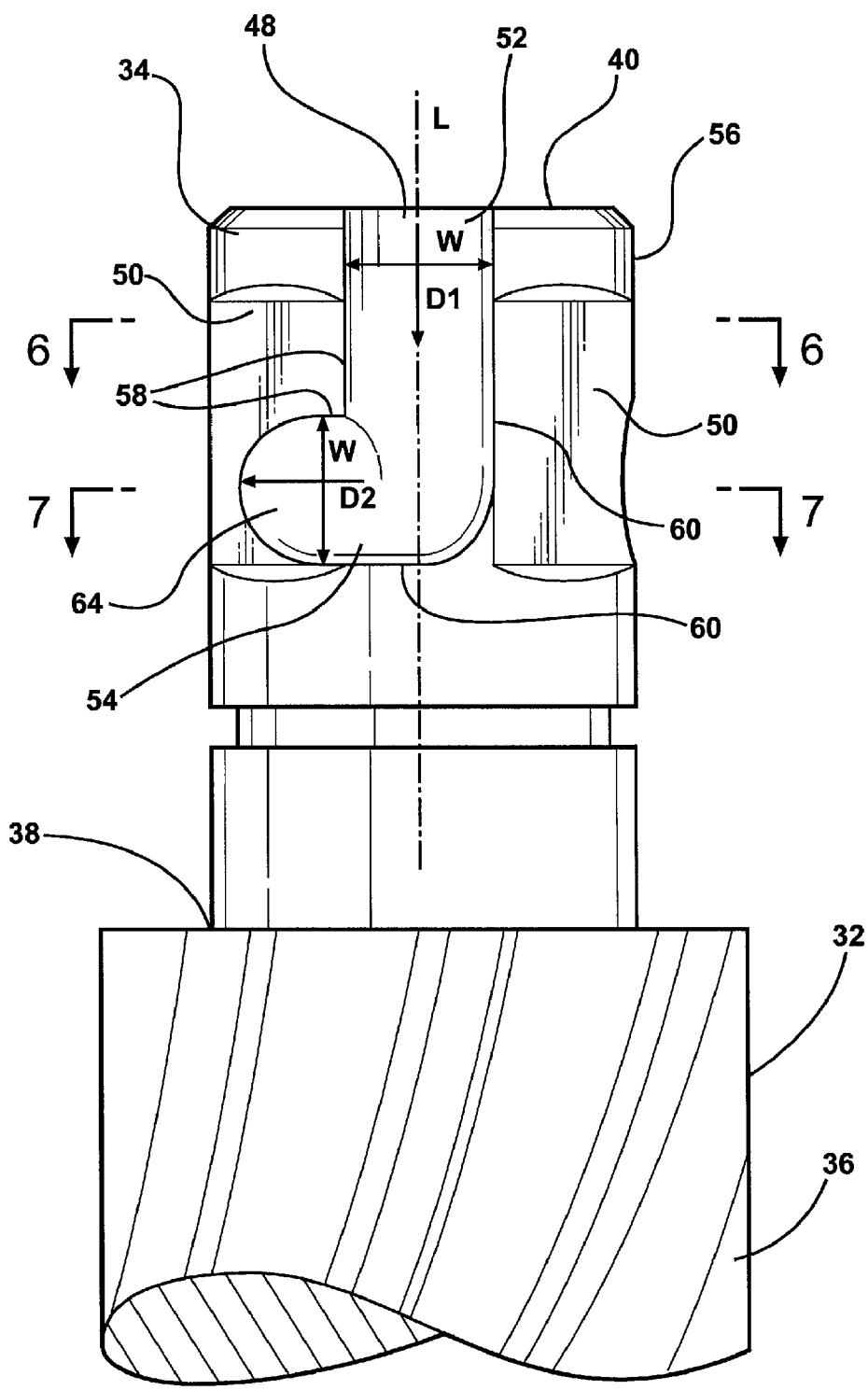
FIG. 4 is a side view of a portion of the cutter.

As best shown in FIG. 4, the retaining recess 48 is further defined as an entry channel 52 and a retaining channel 54 extending from the entry channel 52, i.e., the shank portion 34 defines the entry channel 52 and the retaining channel 54. In the configuration shown in the Figures including the plurality of retaining recesses 48, each of the retaining recesses 48 include one of the entry channels 52 and one of the retaining channels 54 extending from the entry channel 52.

The entry channel 52 extends from the second end 40 of the shank portion 34 for guiding the driving device 30 of the arbor 26 during insertion of the shank portion 34 into the arbor 26. The retaining channel 54 selectively retains the driving device 30 of the arbor 26. Specifically, in the configuration shown in FIG. 2, the engagement between the retaining channel 54 and the extending member 42 vertically retains the cutter 32 in the arbor 26 and, as best shown in FIG. 8, rotation of the arbor 26 in the right direction, i.e., clockwise, drives the extending members 42 and the cutter 32 in the right direction.

In the configuration where the driving device 30 is further defined as at least one extending member 42, the extending members 42 are slideable along the entry and retaining channels 52, 54. For example, in the configuration where the driving device 30 is further defined as the ball engaged with the arbor 26, the ball is slideable along the entry and retaining channels 52, 54. The second end 40 of the shank portion 34 is inserted into the bore 28 of the arbor 26. The cutter 32 is rotated to align the extending members 42 with the entry channels 52 at the second end 40 of the shank portion 34. When the entry channels 52 are aligned with the extending members 42, the cutter 32 is moved into the bore 28 with the extending members 42 sliding along the entry channels 52. The extending members 42 are aligned with the retaining channels 54 when the extending members 42 are moved along the length of the entry channel 52. In the configuration shown in the Figures, when the extending members 42 are aligned with the retaining channels 54, the cutter 32 is rotated in the right direction, i.e., clockwise, to the position shown in FIG. 8. In such a configuration, the motor 24 rotates the arbor 26 in the right direction such that the extending members 42 drive the cutter 32 such that the cutter 32 is rotated in the right direction. It should be appreciated that the configuration of the shank portion 34 and the arbor 26 to accommodate the rotation of the motor 24 in the right direction is shown for exemplary purposes. Alternatively, the shank portion 34 and the arbor 26 may be configured to accommodate the rotation of the motor 24 in the left direction. In such a configuration, the shank portion 34 and the arbor 26 are mirror images of the configuration shown in FIG. 8 in which case the motor 24 rotates the arbor 26 in the left direction such that the extending members 42 drive the cutter 32 such that the cutter 32 is rotated in the left direction.

The method described above allows for quick engagement and disengagement of the cutter 32 and the arbor 26 because the only required movement is the axial translation of the cutter 32 in a direction along the central axis C and the rotational movement of the cutter 32 about the central axis C. The cutter 32 can typically be engaged and disengaged with the arbor 26 with the use of only one hand. Notably, the cutter 32 does not require an arbor 26 that has moving extending members 42 to move into and out of engagement with the retaining recess 48. In other words, the cutter 32 can be used in the arbor 26 that has extending members 42 fixed in position in the bore 28 as well as the arbor 26 that has extending members 42 that selectively move into and out of the bore 28.

The shank portion 34 presents a cylindrical surface 56 extending circumferentially about the central axis C and the entry and retaining channels 52, 54 are defined in the cylindrical surface 56. Each of the entry and retaining channels 52, 54 has a first channel edge portion 58 and a second channel edge portion 60 spaced from each other with a trough portion 62 extending from the first channel edge portion 58 to the second channel edge portion 60. The first and second edge portions 58, 60 are further defined as boundaries between the cylindrical surface 56 and the trough portion 62, i.e., the first and second edge portions 58, 60 do not need to present angles between the cylindrical surface 56 and the trough portion 62 and can alternatively be rounded. Each trough portion 62 extends toward the central axis C between the first and second channel edge portions 58, 60. The trough portions 62 of each of the entry and retaining channels 52, 54 have a common configuration for slideably receiving the driving device 30.

The common configuration includes the depth of the trough portion 62, i.e., the trough portion 62 of each of the entry and retaining channels 52, 54 extend at a common depth D measured radially from the central axis C. The common depth D allows the extending member 42 to freely slide along the entry and retaining channels 52, 54 without interference with a bottom of the trough portion 62, i.e., without bottoming out. It should be appreciated that the entry and retaining channels can have differing depths without departing from the nature of the present invention. For example, the entry and/or retaining channels 52, 54 can present a ramp for selectively retaining the extending member 42 in the retaining channel 54.

Another common configuration includes the width of the trough portion 62, i.e., each of the entry and retaining channels 52, 54 has a width W measured between and transverse to the first and second channel edges with the width W of the entry channel 52 equal to the width W of the retaining channel 54. The common width W allows the extending member 42 to freely slide along the entry and retaining channels 52, 54 without interference with the first and second channel edge portions 58, 60. It should be appreciated that the entry and retaining channels 52, 54 can have different widths without departing from the nature of the present invention. Also, it should be appreciated that the widths of the entry and retaining channels 52, 54 can vary along the lengths of the entry and retaining channels 52, 54, respectively, without departing from the nature of the present invention.

Yet another common configuration includes the cross-sectional shape of the trough portion 62, i.e., each of the entry and retaining channels 52, 54 has a cross-sectional shape and the cross-sectional shape of the entry channel 52 is the same as the cross-sectional shape of the retaining channel 54. However, it should be appreciated that the cross-sectional shape of the entry channel 52 can be different than the cross-sectional shape of the retaining channel 54 without departing from the nature of the present invention. Typically, the driving device 30 is complimentary in configuration to the cross-sectional shape of the entry and retaining channels 52, 54, e.g., a cross-section of a portion of the extending member 42 that slides along the entry and retaining channels 52, 54 is the same as the cross-section of the entry and retaining channels 52, 54. In the configuration shown in FIGS. 1, 2, and 8, the cross-sectional shape is further defined as an arc and the driving devices 30, i.e., the balls, have a spherical shape. As best shown in FIG. 2, the cross-section of the portion of the extending member 42 that slides along the entry and retaining channels 52, 54 is arced and thereby is complimentary in configuration to the cross-sectional shape of the entry and retaining channels 52, 54.

Figure 10A:
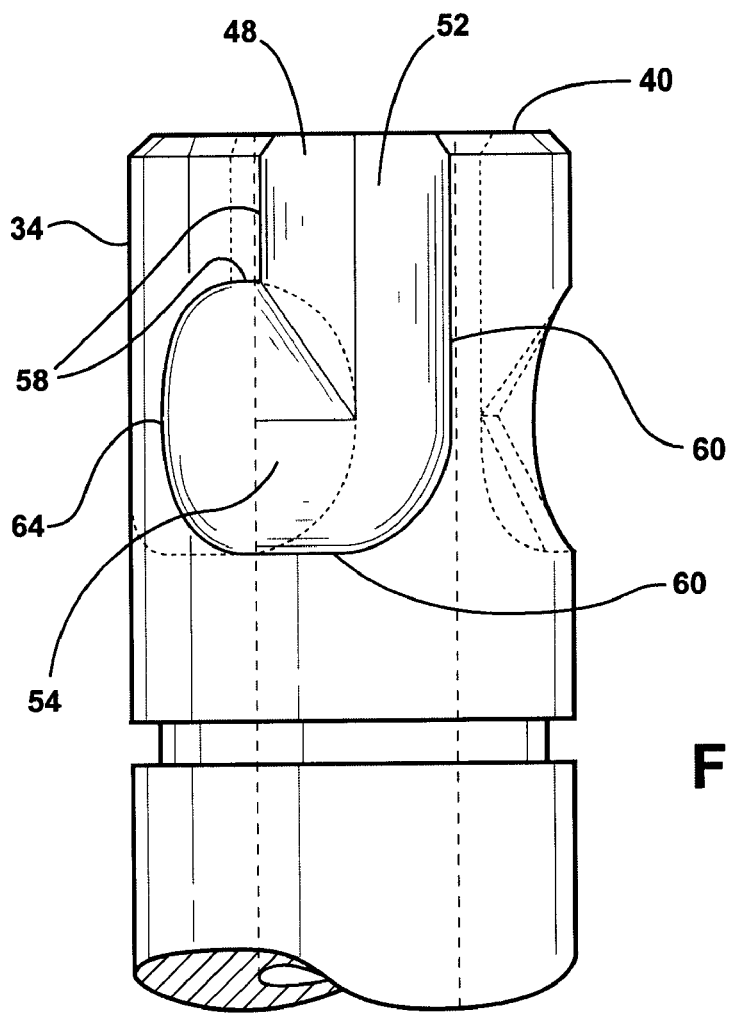
FIG. 10A is a side view of a portion of another embodiment of the cutter.
Figure 10B:
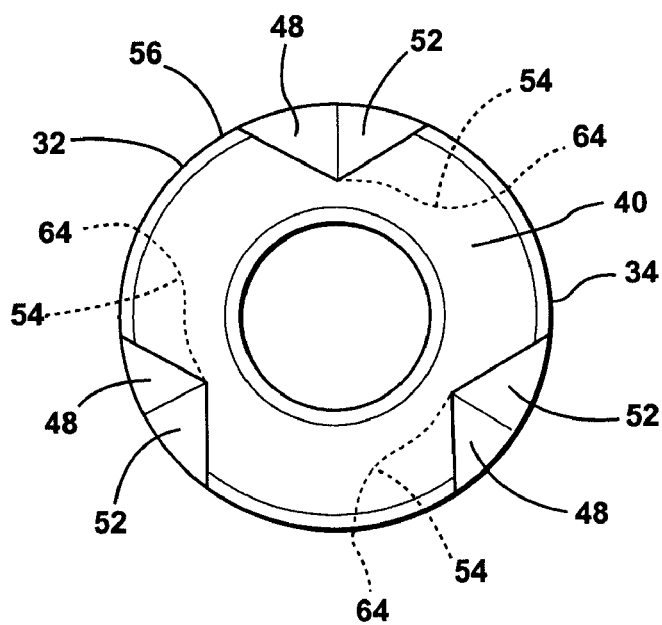
FIG. 10B is a top view of a portion of the embodiment of the cutter shown in FIG. 10A.
Figure 11A:
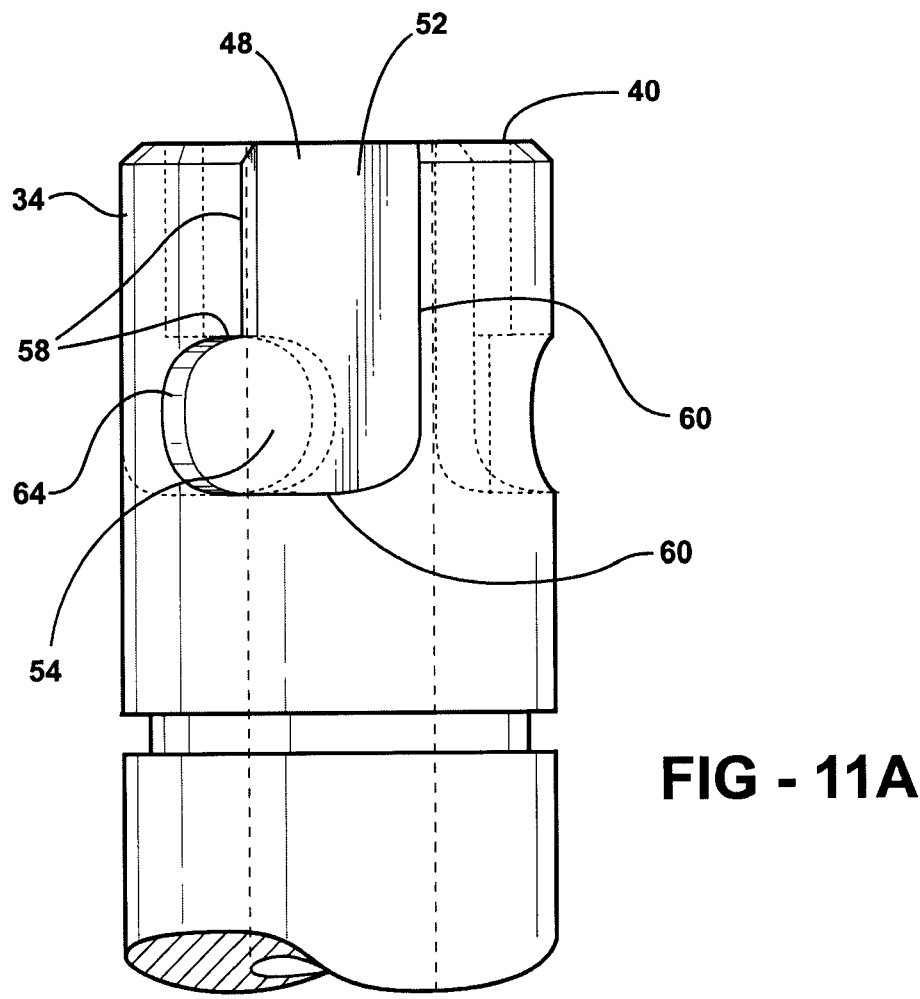
FIG. 11A is a side view of a portion of yet another embodiment of the cutter.
Figure 11B:
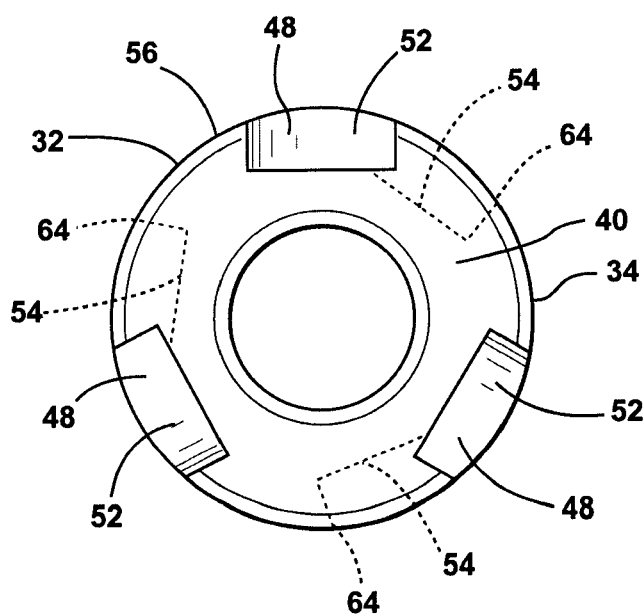
FIG. 11B is a top view of a portion of the embodiment of the cutter shown in FIG. 11A.

Alternatively, as shown in FIG. 10A-B, the cross-sectional shape of the trough portion 62 is V-shaped. In such a configuration, the cross-section of the portion of the extending member 42 that slides along the entry and retaining channels 52, 54 can be V-shaped. As shown in FIGS. 11A-B, the cross-sectional shape of the trough portion 62 is square-shaped. In such a configuration, the cross-section of the portion of the extending member 42 that slides along the entry and retaining channels 52, 54 can be squared. However, it should be appreciated that the extending members 42 can be further defined as balls having the spherical shape for use with both the V-shaped entry and retaining channels 52, 54 and the square-shaped entry and retaining channels 52, 54.

It should be appreciated that the cross-sectional shape of the trough portion 62 may be any shape without departing from the nature of the present invention. It should also be appreciated that while the driving device 30 is typically complimentary in configuration to the cross-sectional shape of the entry and retaining channels 52, 54, the cross-section of the portion of the driving device 30 that slides along the entry and retaining channels 52, 54 can be different than the cross-sectional shape of the trough portion 62 without departing from the nature of the present invention.

The entry channel 52 extends along the shank portion 34 in a first direction D1 and the retaining channel 54 extends along the shank portion 34 in a second direction D2 different than the first direction D1. Typically, the first direction D1 extends approximately perpendicular to the second direction D2. Specifically, as best shown in FIG. 4, the entry channel 52 extends axially along the shank portion 34. In other words, the entry channel 52 extends in parallel with the central axis C of the cutter 32. The retaining channel 54 extends circumferentially along the shank portion 34. However, it should be appreciated that the entry channel 52 can extend at an angle relative to the central axis C and the first direction D1 can extend at a non-perpendicular angle relative to the second direction D2 without departing from the nature of the present invention.

The entry portion extends along a longitudinal axis L and the retaining channel 54 extends at an angle A2 circumferentially about the central axis C from the longitudinal axis L to a retaining channel end 64. For example, the angle A2 is between 50 and 60 degrees. More specifically, the retaining channel 54 extends at approximately 55 degrees circumferentially about the central axis C from the longitudinal axis L to retaining channel end 64. For example, as best shown in FIG. 8, the extending member 42 is sized such that the cutter rotates at an angle A3 relative to the extending member. For example, the angle A3 is between 30 and 40 degrees. For example, in a configuration where the angle A3 is 35 degrees, when the second end 40 of the shank portion 34 is inserted into the bore 28 and the extending member 42 is aligned with the retaining channel 54, the cutter 32 is rotated approximately 35 degrees in the right direction to fully engage the cutter 32 with the arbor 26. It should be appreciated that angle A2 and angle A3 can be of any magnitude without departing from the nature of the present invention.

Figure 6:
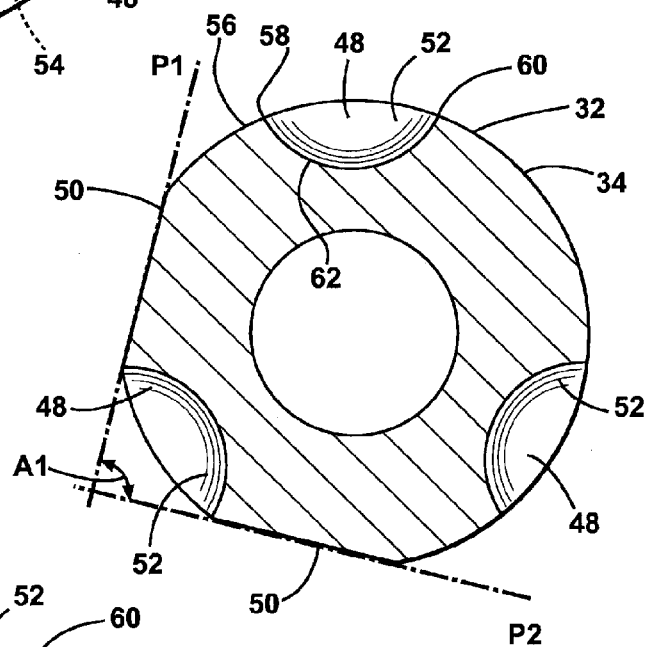
FIG. 6 is a cross-sectional view of the cutter through line 6 of FIG. 4.
Figure 7:
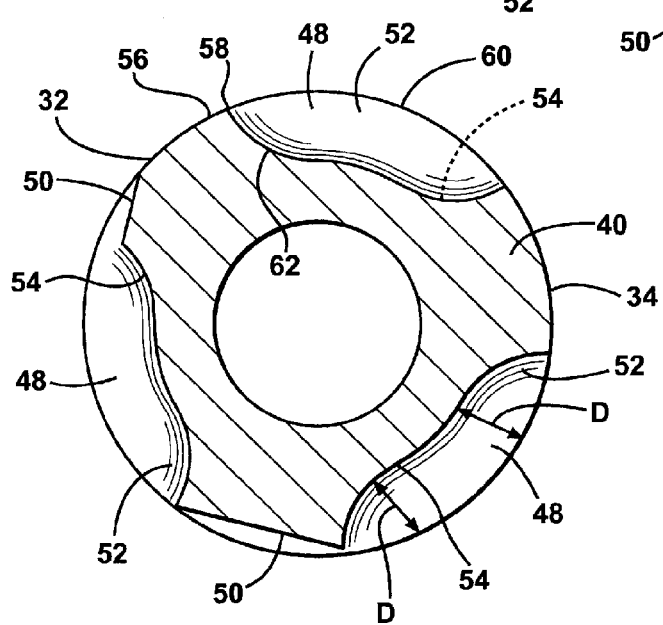
FIG. 7 is a cross-sectional view of the cutter through line 7 of FIG. 4.

As best shown in FIGS. 5-7, one of the pair of flats 50 extends in a first plane P1 and the other of the pair of flats 50 extends in a second plane P2. As best shown in FIG. 6, the first and second planes P1, P2 extend at an angle A1 relative to each other. Preferably the angle A1 is 90 degrees, i.e., the second plane P2 extends perpendicular to the first plane P1. As best shown in FIG. 9, in the configuration where the extending member 42 is further defined as the pair of set screws 44, the arbor 26 defines set screw holes and the set screws 44 are threadedly engaged with the set screw holes. In the configuration where the angle A1 is 90 degrees, the set screw holes are arranged approximately 90 degrees apart circumferentially and extend approximately perpendicularly relative to each other.

The position of the pair of flats 50 perpendicular to each other allows for stable engagement between the arbor 26 and the cutter 32. Specifically, the pair of set screws 44 engaging the pair of perpendicular flats 50 forces the cutter 32 against the bore 28 of the arbor 26 and centers the cutter 32 in the arbor 26. The position of the pair of flats 50 perpendicular to each other also allows for effective transmission of rotational motion from the arbor 26 to the cutter 32. In other words, each of the set screws 44 engage the flats 50, respectively, to transmit rotation of the arbor 26 to the cutter 32.

In such a configuration, the second end 40 of the shank portion 34 is inserted into the bore 28 of the arbor 26. The cutter 32 is rotated to align the pair of flats 50 with the pair of set screws 44. When the pair of flats 50 are aligned with the pair of set screws 44, the set screws 44 are threadedly advanced toward the cutter 32 to engage the pair of flats 50, as shown in FIG. 9. The motor 24 rotates the arbor 26 and the set screws 44 drive the cutter 32 such that the cutter 32 is rotated with the arbor 26. It should be appreciated that the cutter 32 can also be used with an arbor 26 that has only one set screw 44 and in such a configuration the one set screw 44 is threadedly advanced to engage one of the pair of flats 50.

As best shown in FIG. 6, the pair of flats 50 are spaced from each other with the retaining recess 48 disposed between the pair of flats 50. As best shown in FIG. 5, the pair of flats 50 are recessed toward the central axis C from the cylindrical surface 56. As best shown in FIG. 5, the shank portion 34 has a reference plane RP extending through the central axis C and the longitudinal axis L. The first plane P1 of one of the pair of flats 50 extends at an angle A4 from the reference plane RP and the second plane P2 of the other of the pair of flats 50 extends at an angle A5 from the reference plane RP. In the embodiment shown in FIG. 5, the first plane P1 extends at approximately 45 degrees from the reference plane RP, i.e., the angle A4 is 45 degrees, and the second plane P2 extends at approximately 135 degrees from the reference plane RP, i.e., the angle A5 is 135 degrees.

The drill machine 20 and the arbor 26 can include a lubrication system 66 as shown in FIGS. 1-3. In such a configuration, the cutter 32 defines a hole extending along the central axis C and the cutter 32 slideably receives a pilot 68 in the hole. When the cutter 32 is contacted to the workpiece, the pilot 68 is forced upwardly to allow lubricant to flow from the arbor 26 toward the workpiece. It should be appreciated that the drill machine 20 and the arbor 26 can include any type of lubrication system 66 without departing from the nature of the present invention.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A drill machine comprising:
    a housing;
    a motor coupled to said housing;
    an arbor defining a bore and coupled to said motor for rotation with said motor;
    a driving device coupled to said arbor and extending into said bore; and
    a cutter including a shank portion and a cutting portion with said shank portion having a central axis and extending along said central axis between a first end and a second end and with said cutting portion extending from said first end;
    said shank portion defining an entry channel extending from said second end for guiding said driving device of said arbor during insertion of said shank portion into said arbor and a retaining channel extending from said entry channel and terminating at a spherical surface for selectively retaining said driving device of said arbor, wherein said shank portion is cylindrical and has a constant diameter between said first end and said second end; and
    each of said entry and retaining channels having a trough portion extending toward said central axis with said trough portions of each of said entry and retaining channels having a common configuration for slideably receiving said driving device;
    wherein said spherical surface of said retaining channel extends outwardly relative to said central axis from said trough portion of said retaining channel for engaging said driving device to transmit rotation from said arbor to said cutter as said arbor rotates.

2. The drill machine as set forth in claim 1 wherein each of said entry and retaining channels has a first channel edge portion and a second channel edge portion spaced from each other with said trough portion extending from said first channel edge portion to said second channel edge portion.

3. The drill machine as set forth in claim 1 wherein said trough portion of each of said entry and retaining channels extend at a common depth measured radially from said central axis.

4. The drill machine as set forth in claim 1 wherein each of said entry and retaining channels has a width measured between and transverse to said first and second channel edges with said width of said entry channel equal to said width of said retaining channel.

5. The drill machine as set forth in claim 1 wherein each of said entry and retaining channels have a cross-sectional shape and wherein said cross-sectional shape of said entry channel is the same as said cross-sectional shape of said retaining channel.

6. The drill machine as set forth in claim 5 wherein said driving device is complimentary in configuration to said cross-sectional shape of said entry and retaining channels.

7. The drill machine as set forth in claim 6 wherein said cross-sectional shape is further defined as an arc and wherein said driving device has a spherical shape.

8. The drill machine as set forth in claim 1 wherein said entry channel extends along said shank portion in a first direction and said retaining channel extends along said shank portion in a second direction different than said first direction.

9. The drill machine as set forth in claim 8 wherein said first direction extends perpendicular to said second direction.

10. The drill machine as set forth in claim 1 wherein said entry channel extends axially along said shank portion and said retaining channel extends circumferentially along said shank portion.

11. The drill machine as set forth in claim 1 wherein said entry portion extends along a longitudinal axis and said retaining channel extends between 50 and 60 degrees circumferentially about said central axis from said longitudinal axis to a retaining channel end.

12. The drill machine as set forth in claim 1 wherein said entry and retaining channels are further defined as a plurality of retaining recesses spaced from each other circumferentially about said shaft portion with each of said retaining recesses including one of said entry channels and one of said retaining channels extending from said entry channel and wherein said driving device is further defined as a plurality of driving devices spaced circumferentially in said bore of said arbor with each of said driving devices slideable along one of said retaining recesses, respectively.

13. The drill machine as set forth in claim 1 wherein said driving device is further defined as a ball engaged with said arbor and slideable along said entry and retaining channels.

14. A cutter for driven engagement with a driving device of an arbor, said cutter comprising:
 a shank portion having a central axis and extending along said central axis between a first end and a second end and defining an entry channel extending from said second end for guiding the driving device of the arbor during insertion of said shank portion into the arbor and a retaining channel extending from said entry channel and terminating at a spherical surface for selectively retaining the driving device of the arbor, wherein said shank portion is cylindrical and has a constant diameter between said first end and said second end; and
 a cutting portion extending from said first end of said shank portion;
 each of said entry and retaining channels having a trough portion extending toward said central axis with said trough portions of each of said entry and retaining channels having a common configuration for slideably receiving said driving device;
 wherein said spherical surface of said retaining channel extends outwardly relative to said central axis from said trough portion of said retaining channel for engaging the driving device to transmit rotation from the arbor to said shank portion as said arbor rotates.

15. The cutter as set forth in claim 14 wherein each of said entry and retaining channels has a first channel edge portion and a second channel edge portion spaced from each other with said trough portion extending from said first channel edge portion to said second channel edge portion.

16. The cutter as set forth in claim 14 wherein said trough portion of each of said entry and retaining channels extend at a common depth measured radially from said central axis.

17. The cutter as set forth in claim 14 wherein each of said entry and retaining channels has a width measured between and transverse to said first and second channel edges with said width of said entry channel equal to said width of said retaining channel.

18. The cutter as set forth in claim 14 wherein each of said entry and retaining channels have a cross-sectional shape and wherein said cross-sectional shape of said entry channel is the same as said cross-sectional shape of said retaining channel.

19. The cutter as set forth in claim 18 wherein said cross-sectional shape is further defined as an arc.

20. The cutter as set forth in claim 14 wherein said entry channel extends along said shank portion in a first direction and said retaining channel extends along said shank portion in a second direction different than said first direction.

21. The cutter as set forth in claim 18 wherein said first direction extends perpendicular to said second direction.

22. The cutter as set forth in claim 14 wherein said entry channel extends axially along said shank portion and said retaining channel extends circumferentially along said shank portion.

23. The cutter as set forth in claim 14 wherein said entry portion extends along a longitudinal axis and said retaining channel extends between 50 and 60 degrees circumferentially about said central axis from said longitudinal axis to a retaining channel end.

24. The cutter as set forth in claim 14 wherein said entry and retaining channels are further defined as a plurality of retaining recesses spaced from each other circumferentially about said shaft portion with each of said retaining recesses including one of said entry channels and one of said retaining channels extending from said entry channel.

25. The cutter as set forth in claim 1 wherein said driving device is nested with said spherical surface of said retaining channel when said motor rotates said arbor for driving rotation of said of said cutter.

26. The cutter as set forth in claim 1 wherein said driving device and said end of said retaining channel are configured to deliver torque from said driving device to said end of said retaining channel when said motor rotates said arbor.

* * * * *